United States Patent
Jiron et al.

(10) Patent No.: US 10,791,222 B2
(45) Date of Patent: Sep. 29, 2020

(54) VOICE CAPTCHA AND REAL-TIME MONITORING FOR CONTACT CENTERS

(71) Applicant: Wells Fargo Bank, N.A., San Francisco, CA (US)

(72) Inventors: Julio Jiron, San Bruno, CA (US); Kevin King, Concord, CA (US); Beth S. Moss, Danville, CA (US); James Lyle Schafer, San Francisco, CA (US); Kalyan Subramanian, Scottsdale, AZ (US); Chris Theodore Kalaboukis, San Jose, CA (US); Raziq Yaqub, Stewartsville, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/014,837

(22) Filed: Jun. 21, 2018

(65) Prior Publication Data

US 2019/0394333 A1 Dec. 26, 2019

(51) Int. Cl.
*H04M 3/51* (2006.01)
*G10L 17/00* (2013.01)
*G06F 21/32* (2013.01)

(52) U.S. Cl.
CPC .......... *H04M 3/5166* (2013.01); *G06F 21/32* (2013.01); *G10L 17/005* (2013.01); *H04M 3/5175* (2013.01); *H04M 3/5183* (2013.01)

(58) Field of Classification Search
CPC ......... H04M 3/436; H04M 2203/2027; H04M 3/2281; H04M 2203/6027;
(Continued)

(56) References Cited

U.S. PATENT DOCUMENTS

| 8,942,357 B2 | 1/2015 | Goulet |
| 9,060,053 B2 | 6/2015 | Rados et al. |

(Continued)

FOREIGN PATENT DOCUMENTS

WO 2016144806 A2 9/2016

OTHER PUBLICATIONS

"Real-Time Fraud Prevention," NICE, retrieved from https://www.nice.com/engage/authentication-and-fraud/real-time-authentication, earliest date of access on or around Sep. 28, 2017, 1 pp.
(Continued)

*Primary Examiner* — Akelaw Teshale
(74) *Attorney, Agent, or Firm* — Shumaker & Sieffert P.A.

(57) ABSTRACT

A call screening computing system is described that is configured to perform voice captcha and real-time monitoring of calls into a contact center of an organization. The call screening computing system includes a chat bot configured to operate as an AI-based call screener. The chat bot is configured to perform voice captcha by sending a random question to a user device placing a call into the contact center, and analyzing the received answer to determine whether a user of the user device is human or a robot. The chat bot is configured to, based on the user being human, determine whether the user is a legitimate customer of the organization by generating and presenting authentication challenges to the user device. The chat bot may be configured to monitor and interact with a conversation between the user and an agent of the organization during the call into the contact center.

23 Claims, 4 Drawing Sheets

(58) Field of Classification Search
CPC ........... H04M 3/42068; H04M 3/5166; H04M 3/5183; H04M 3/5175; G06F 21/32; G10L 17/005

See application file for complete search history.

(56) References Cited

U.S. PATENT DOCUMENTS

| | | | |
|---|---|---|---|
| 9,060,057 B1* | 6/2015 | Danis | H04M 3/42059 |
| 9,203,833 B2 | 12/2015 | Foreman | |
| 9,203,962 B2 | 12/2015 | Guerra et al. | |
| 2012/0039452 A1 | 2/2012 | Horn et al. | |
| 2012/0216260 A1* | 8/2012 | Crawford | G06F 21/31 |
| | | | 726/5 |
| 2013/0163737 A1* | 6/2013 | Dement | H04M 15/70 |
| | | | 379/201.01 |
| 2014/0010357 A1* | 1/2014 | Krishnan | H04M 3/4365 |
| | | | 379/142.17 |
| 2014/0112459 A1* | 4/2014 | Goulet | H04M 3/436 |
| | | | 379/88.01 |
| 2014/0115341 A1* | 4/2014 | Robertson | H04L 9/3228 |
| | | | 713/183 |
| 2014/0119527 A1* | 5/2014 | Cohen | H04M 3/4365 |
| | | | 379/207.13 |
| 2015/0205955 A1* | 7/2015 | Turgeman | H04L 63/1408 |
| | | | 726/7 |
| 2015/0213251 A1* | 7/2015 | Turgeman | G06F 21/32 |
| | | | 726/7 |
| 2016/0300054 A1* | 10/2016 | Turgeman | H04L 63/08 |
| 2017/0048388 A1* | 2/2017 | Sharpe | H04M 3/436 |
| 2017/0090569 A1* | 3/2017 | Levesque | G06F 3/016 |
| 2018/0007199 A1* | 1/2018 | Quilici | H04M 3/42153 |
| 2018/0240473 A1* | 8/2018 | Baracaldo Angel | ......... |
| | | | G10L 15/1822 |
| 2018/0336336 A1* | 11/2018 | Elovici | G06F 21/6218 |
| 2019/0174000 A1* | 6/2019 | Bharrat | H04M 3/4365 |

OTHER PUBLICATIONS

Bataller et al., "Turning artificial intelligence into business value. Today." Accenture, accessed from https://www.accenture.com/t20160814T215045Z_w_/us-acnmedia/Accenture/Conversion-Assets/DotCom/Documents/Gloabal/PDF/Technology_11/Accentrue-Turning-Artificial-Intelligence-into-Business-Vale, 2016, 16 pp. (Applicant points out, in accordance with MPEP 609.04(a), that the year of publication, 2016, is sufficiently earlier than the effective U.S. filing date, so that the particular month of publication is not in issue.).

U.S. Appl. No. 15/905,318, filed Feb. 26, 2018, naming inventors Jiron et al.

\* cited by examiner

VOICE CAPTCHA AND REAL-TIME MONITORING FOR CONTACT CENTERS

TECHNICAL FIELD

The disclosure relates to computing systems, and more specifically, computer-based monitoring of interactions with computing systems.

BACKGROUND

A contact center is a facility configured to handle incoming voice calls from customers or potential customers of a business or organization. One function of the contact center is to handle customer service inquiries focused on customer accounts with the organization, i.e., servicing existing accounts and opening new accounts. Although many customer service inquiries can be handled through online interactions (e.g., via websites, email, or mobile applications), for some organizations, a contact center may be regarded as necessary. Customers of banks, for example, may prefer to speak to a live person when resolving service issues. A contact center may include one or more interactive voice response (IVR) systems and one or more agent desktop systems used by a number of human agents that are representatives of the business. The IVR systems and agent desktop systems may be considered front-end systems of the contact center with which the customers directly interact to resolve their service inquiries. In addition to the front-end systems, the contact center may also include or interact with multiple back-end systems to access information about the organization or about existing customers of the organization in order to properly service a customer's voice call.

SUMMARY

In general, this disclosure describes a call screening computing system configured to perform voice captcha and real-time monitoring of calls into a contact center of an organization. The call screening computing system includes a chat bot configured to operate as an artificial intelligence (AI)-based call screener. The chat bot is configured to perform voice captcha by sending a random question to a user device placing a call into the contact center, and analyzing the received answer to determine whether a user of the user device is human or a robot. The chat bot is also configured to, based on the user being human, determine whether the user is a legitimate customer of the organization by generating and presenting authentication challenges to the user device. The chat bot may be further configured to monitor a conversation between the user and an agent of the organization during the call into the contact center to identify an intent of the call and provide recommendations for follow-up actions to the agent of the organization based on the identified intent. In some examples, when a fraudulent intent is identified, the chat bot may be configured to mimic the agent of the organization and take over control of the call to gather additional information about the fraudulent user for future fraud prevention.

In one example, the techniques of this disclosure are directed to a computer-implemented method comprising receiving, by a computing system and from a user device, a call into a contact center of an organization, wherein the call requests access to an account of a customer at the organization; prior to authenticating a user of the user device as the customer of the organization, sending, by the computing system and to the user device, a random question; receiving, by the computing system and from the user device, an answer to the random question; and determining, by the computing system, that the user of the user device is human and not a robot based on an analysis of the received answer. The method further includes, based on the user being human, generating, by the computing system, one or more authentication challenges based on a customer profile for the customer of the organization; and presenting, by the computing system and to the user device, the one or more authentication challenges used to authenticate the user of the user device as the customer of the organization.

In another example, the techniques of this disclosure are directed to a computing system comprising one or more storage units, and one or more processors in communication with the storage units. The one or more processors are configured to receive, from a user device, a call into a contact center of an organization, wherein the call requests access to an account of a customer at the organization; prior to authenticating a user of the user device as the customer of the organization, send, to the user device, a random question; receive, from the user device, an answer to the random question; determine that the user of the user device is human and not a robot based on an analysis of the received answer; based on the user being human, generate one or more authentication challenges based on a customer profile for the customer of the organization; and present, to the user device, the one or more authentication challenges used to authenticate the user of the user device as the customer of the organization.

In a further example, the techniques of this disclosure are directed to a non-transitory computer readable medium including instructions that when executed cause one or more processors to receive, by a computing system and from a user device, a call into a contact center of an organization, wherein the call requests access to an account of a customer at the organization; prior to authenticating a user of the user device as the customer of the organization, send, by the computing system and to the user device, a random question; receive, by the computing system and from the user device, an answer to the random question; determine, by the computing system, that the user of the user device is human and not a robot based on an analysis of the received answer; based on the user being human, generate, by the computing system, one or more authentication challenges based on a customer profile for the customer of the organization; and present, by the computing system and to the user device, the one or more authentication challenges used to authenticate the user of the user device as the customer of the organization.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
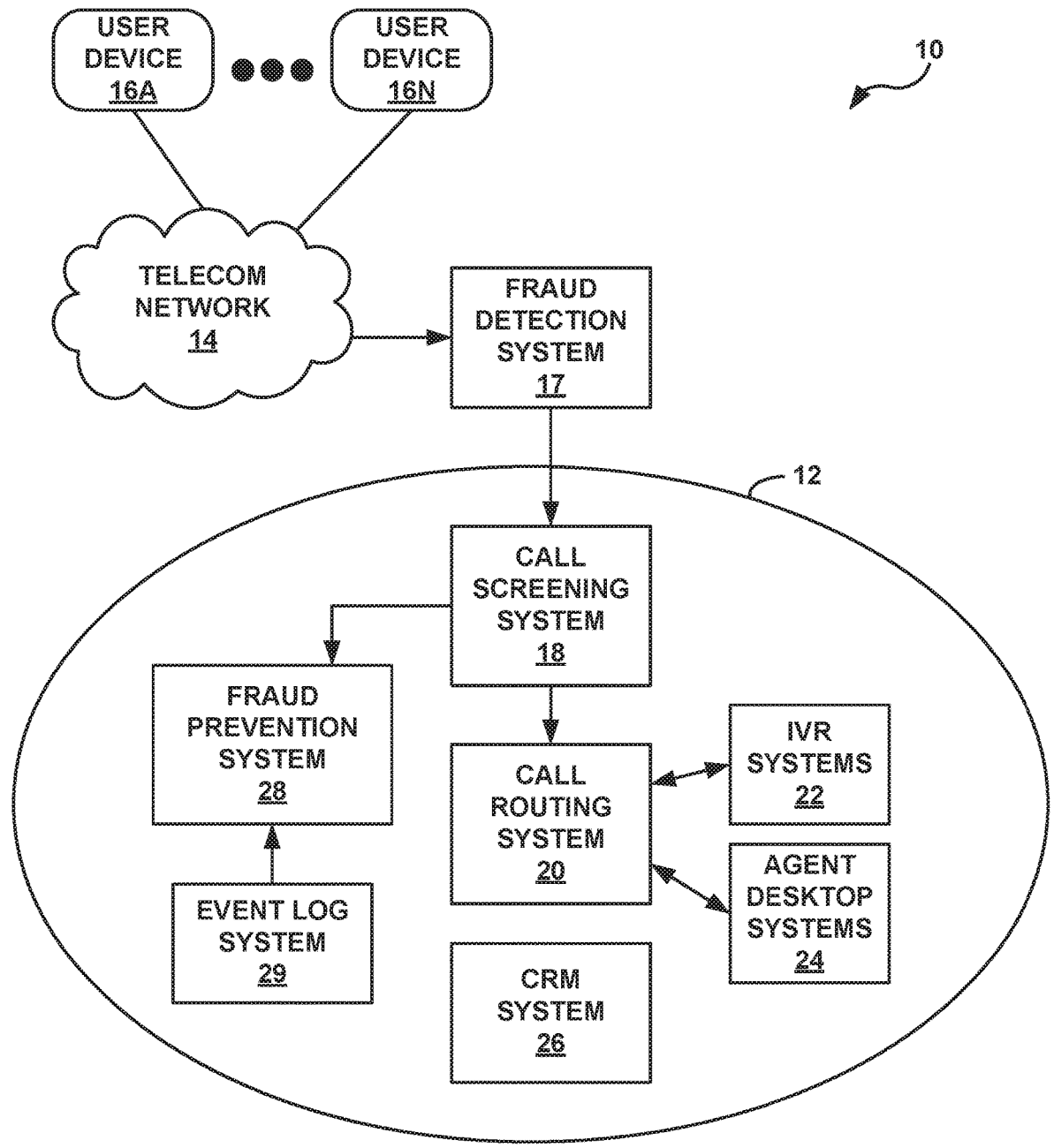
FIG. 1 is a block diagram illustrating an example contact center that includes a call screening system configured to perform voice captcha and real-time monitoring of calls into the contact center, in accordance with the techniques of this disclosure.

FIG. 1 is a block diagram illustrating an example contact center 12 that includes a call screening system 18 configured to perform voice captcha and real-time monitoring of calls into contact center 12, in accordance with the techniques of this disclosure. As illustrated in FIG. 1, network 10 includes one or more user devices 16A-16N (collectively "user devices 16") in communication with contact center 12 via a telecommunications network 14.

Contact center 12 is a facility configured to handle incoming voice calls from user devices 16 operated by users that may be customers or non-customers of a business or organization. In some cases, contact center 12 may be referred to as a call center. Contact center 12 includes several disparate computing systems configured to handle customer service inquiries focused on customer accounts with the organization, i.e., servicing existing accounts and opening new accounts. In some examples described in this disclosure, contact center 12 may be a contact center of a bank or other financial institution. Contact center 12 may be especially useful for those customers that prefer to speak to a live person when resolving service issues or that feel more comfortable sharing personal information over a voice channel than an online channel (e.g., website, email, or mobile application). Contact center 12 may also provide certain services that may not be available via online channels, such as opening new accounts with the organization.

User devices 16 may be any suitable communication or computing device, such as a conventional or landline phone, or a mobile, non-mobile, wearable, and/or non-wearable computing device capable of communicating over telecom network 14. One or more of user devices 16 may support communication services over packet-switched networks, e.g., the public Internet, including Voice over Internet Protocol (VOIP). One or more of user device 16 may also support communication services over circuit-switched networks, e.g., the public switched telephone network (PSTN).

Each of user devices 16 is operated by a user (i.e., the caller) that may be a customer or a non-customer of the organization that provides contact center 12. In the case of a business or corporate customer, the user may be a representative of the business or corporate customer. In some examples, the user may be a non-human robo-caller utilized by a fraudster or bad actor. In general, each of user devices 16 may represent a landline phone, a conventional mobile phone, a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

Telecom network 14 may be a computer network (e.g., a wide area network (WAN), such as the Internet, a local area network (LAN), or a virtual private network (VPN)), a telephone network (e.g., the PSTN or a wireless network), or another wired or wireless communication network. Although illustrated as a single entity, telecom network 14 may comprise a combination of multiple networks.

Contact center 12 may comprise a centralized or distributed network of the disparate computing systems made up of interconnected desktop computers, laptops, workstations, wireless devices, network-ready appliances, file servers, print servers, or other computing devices. For example, contact center 12 may comprise one or more data centers including a plurality of servers configured to provide account services interconnected with a plurality of databases and other storage facilities in which customer credentials, customer profiles, and customer accounts are stored. Contact center 12 may include both "front-end systems" with which the customers or non-customers of the organization directly interact to resolve service inquiries, and "back-end systems" in which information about contact center 12, the organization, or existing customers of the organization is maintained.

In the example of FIG. 1, contact center 12 includes one or more interactive voice response (IVR) systems 22, one or more agent desktop systems 24 used by a number of human agents that are representatives of the organization, and a customer relationship management (CRM) system 26 as "front-end systems." In this example, the front-end systems may be used by the organization to interact with its customers to resolve the customers' service inquiries. Contact center 12 also includes call screening system 18, a call routing system 20, a fraud prevention system 28, and an optional event log system 29 as "back-end systems." In this example, the back-end systems may be tools used by the organization to facilitate the functions of contact center 12, including collecting, storing, and maintaining data used by contact center 12. In addition, contact center 12 interacts with fraud detection system 17 as another "back-end system," which may be included in contact center 12 itself or may be administered by a third-party network (not shown). The architecture of contact center 12 illustrated in FIG. 1 is shown for exemplary purposes only and should not be limited to this architecture. In other examples, contact center 12 may include more, fewer, or different computing systems configured to handle customer service inquiries.

In the example of FIG. 1, one of user devices 16, e.g., user device 16A, may initiate a call to contact center 12 in response to input from a user of user device 16A. User device 16A outputs a signal over telecom network 14. Fraud detection system 17 may operate as a gateway to contact center 12 by providing an initial determination of whether an inbound call is fraudulent. For example, fraud detection system 17 may compare markers, e.g., phoneprints or voiceprints, for the inbound call to known fraudsters, and provide risk information to contact center 12. In some examples, fraud detection system 17 may be implemented using fraud detection solutions for call centers available through Pindrop®. Fraud detection system 17 may provide a risk score or other indication of potentially fraudulent intent for each inbound call to contact center 12.

According to the techniques of this disclosure, call screening system 18 of contact center 12 receives the inbound call and performs voice captcha (i.e., completely automated public Turing test to tell computers and humans apart) to determine whether the user of user device 16A is human or a robot. Call screening system 18 comprises an artificial intelligence (AI)-based call screener. For example, the AI-based call screener of call screening system 18 may be a chat bot capable of conducting a conversation with the user of user device 16A placing the incoming call to contact center 12.

To perform the voice captcha, call screening system 18 sends a random question to user device 16A, and analyzes the received answer to determine whether the received answer is a human response. Call screening system 18 randomly selects the question such that the question cannot be anticipated and, thus, robo-callers cannot be programmed to provide an acceptable response to the question. In this way, the random question requires a human response. Accordingly, the techniques of this disclosure may improve the technical field of user authentication and authorization by providing a captcha technique that is applicable to voice calls.

The analysis of the received answer may be performed based on several factors depending on the form of the received answer. When the received answer is a touch-tone response or a verbal response, call screening system 18 may determine whether the received answer is an acceptable response to the random question. An acceptable response may be a correct answer to the random question, or merely an intelligible response that provides a wrong answer to the random question but falls into an acceptable category based on format (e.g., alpha or numeric), language, form of speech, or the like. As one example, if the random question is "What color is the sky?" then an acceptable response may be "blue," i.e., the correct answer, or "red," i.e., a theoretically wrong answer that falls into the acceptable category of a color name. In this example, an unintelligible response may be a numeric response, e.g., "82045," or a response that is a different form of speech than a color name, e.g., "yes." When the received answer is a verbal response, call screening system 18 may also perform voice analysis to determine whether the verbal response is generated by a human voice.

In the case where the user of user device 16A is determined to be a robot, call screening system 18 sends the inbound call to fraud prevention system 28. As described in more detail below, fraud prevention system 28 may apply one or more interdiction schemes to the robotic call. However, in order to provide a high-quality of customer service to all customers of the organization, it may not be desirable to simply drop all robotic callers as some customers may use speech synthesizers or other robotic means to communicate verbally. Call screening system 18, therefore, may either hold or route calls from users determined to be robots for further analysis to determine whether the robotic call is from a legitimate customer. As one example, call screening system 18 may access a customer profile from CRM system 26 to determine whether a phone number or other identifying information of the inbound call belongs to a customer that uses a voice synthesizer. As another example, call screening system 18 may route the robotic call to fraud prevention system 28 or another system in contact center 12 to determine whether the call belongs to a customer that uses a voice synthesizer.

In the case where the user of user device 16A is determined to be human, call screening system 18 generates one or more authentication challenges based on a customer profile for the customer of the organization retrieved from CRM system 26. The customer profile includes dynamic or modifiable customer information, such as account information, contact information, customer preferences, and, in some cases, customer social media data. The authentication challenges may comprise questions to be answered by the user of user device 16A to be authenticated as the customer of the organization, where the answers to the questions are based on the customer profile for the customer. In this way, beyond performing voice captcha to filter out unwanted robo-callers, call screening system 18 generates ad hoc authentication challenges for specific customers based on the associated customer profile. These ad hoc authentication challenges differ from the more traditional general-purpose authentication challenges based on static customer information, such as the last-four digits of the customer's social security number or the customer's mother's maiden, and, thus, may be more difficult for a fraudster or bad actor to discover. As described in more detail below, the authentication challenges generated by call screening system 18 may be presented to user device 16A via the one of IVR systems 22 or agent desktop systems 24 performing user authentication.

Furthermore, in the case where the user of user device 16A is determined to be human, call screening system 18 routes the inbound call to call routing system 20. Call routing system 20 determines whether to route the inbound call to one of IVR systems 22 or one of agent desktop systems 24. Call routing system 20 may route calls to one of a number of destinations, including to IVR systems 22, agent desktop systems 24, or to other devices, users, or systems. In some examples, call routing system 20 may be implemented using call routing solutions available through Genesys Telecommunications Laboratories. In an example where user device 16A requests to speak with a human agent or selects a service that can only be performed by a human agent, call routing system 20 routes the call to one of agent desktop systems 24, thereby enabling the user of user device 16A and a human agent at the one of agent desktop systems 24 to engage in a voice communication session, i.e., a verbal conversation. In an example where user device 16A selects a service for which an IVR program is available, call routing system 20 routes the call to the appropriate one of IVR systems 22, thereby enabling the user of user device 16A to interact with the IVR program.

Authentication of the user operating user device 16A may be performed by either an authentication IVR program provided by one of IVR systems 22 or any of the human agents at agent desktop systems 24. As described above, the authentication challenges used to authenticate the user as the customer of the organization may be generated by call screening system 18 for presentation to user device 16A via IVR systems 22 or agent desktop systems 24. As one example, call screening system 18 may present the authentication challenges to the user of user device 16A as one of the prompts in the authentication IVR program of the one of IVR systems 22. The one of IVR systems 22 may then store the responses received from the user via user device 16A and, based on the responses, make a determination about whether the user of user device 16A is authenticated as the customer or issue additional authentication challenges.

As an alternative example, call screening system 18 may present the authentication challenges to a human agent at one of agent desktop systems 24, and the human agent may, in turn, present the authentication challenges to the user of user device 16A during the voice communication session. Upon hearing the responses of the user of user device 16A, the human agent may make a determination about whether the user of user device 16A is authenticated as the customer or issue additional authentication challenges. In either example, the authentication determination may be based on the ad hoc authentication challenges generated by call screening system 18 and the customer profile for the customer accessible from CRM system 26.

Once the user of user device 16A is authenticated as a customer of the organization, one or more of IVR systems 22 and/or the human agents at agent desktop systems 24 may process account service inquiries received from the customer via user device 16A. In the example of a bank or other financial institution, the account service inquiries may include account balance inquiries, most recent transaction inquiries, money transfers, opening or closing accounts, updating or resetting security credentials, changing or rebalancing investment funds, and the like. IVR systems 22 and the human agents at agent desktop systems 24 may process the account service inquiries by accessing customer accounts and/or accessing customer profiles from CRM system 26.

In the example where the call is handled by a human agent at one of agent desktop systems 24, call screening system 18 may monitor the voice communication session or conversation between the customer and the agent. Call screening system 18 may perform real-time analysis on aspects of the conversation using an AI engine to identify either a fraudulent or a neutral intent of the conversation. In some examples, the AI engine may also provide a level of probability associated with the identified intent, e.g., how likely is it that the AI engine correctly identified the intent of the call as fraudulent.

If the AI engine identifies a neutral intent, call screening system 18 may send a notification message to the agent at the one of agent desktop systems 24 that the call is likely neutral. In some examples, call screening system 18 may include the level of probability that the call could be fraudulent along with the neutral intent notification so that the agent has an understanding of the certainty associated with the intent determination. Along with a neutral intent notification, call screening system 18 may also provide product sales recommendations for the agent to offer to the customer during the call. Call screening system 18 may generate the product sales recommendations targeted to the customer based on the customer profile for the customer accessible from CRM system 26.

If the AI engine identifies a fraudulent intent, call screening system 18 may send a notification message to the agent at the one of agent desktop systems 24 that the call is potentially fraudulent, and may provide suggested fraud prevention actions for the agent to perform during the call with the fraudulent user. In this scenario, the fraudulent intent is identified after the user has been authenticated as the customer of the organization, so the fraudulent user may be the actual customer or may be impersonating the actual customer of the organization.

The fraud prevention actions suggested to the agent at the one of agent desktop systems 24 by call screening system 18 may include taking notes or otherwise logging the fraudulent user's behavior during the call, asking the fraudulent user specific questions during the call in an attempt to obtain additional information, or transferring the call to fraud prevention system 28 of contact center 12. In some examples, the suggested fraud prevention actions may also include transferring the call to a chat bot of call screening system 18. In other examples, a call control transfer from the agent at the one of agent desktop systems 24 to the chat bot of call screening system 18 may be triggered based on the level of probability associated with the fraudulent intent of the call, an unprompted transfer request by the agent at the one of agent desktop systems 24, or some action requested by the fraudulent user.

The chat bot of call screening system 18 may mimic a human agent and continue the conversation with the fraudulent user of user device 16A in order to obtain additional information about the fraudulent user. In some scenarios, compared to a human agent or existing computing systems, the chat bot may be better able to obtain identifying or other information about the fraudulent user that may be used to create a fraud profile or signature, e.g., for future use by fraud prevention system 28 and/or fraud detection system 17. Unlike a human agent or existing computing systems, the chat bot has access to all of the customer information available to the organization, e.g., account information, contact information, customer preferences, and, in some cases, customer social media data, and has the ability to process the customer information and the conversation with the fraudulent user in real time using the AI engine. In this way, the chat bot may be better able to identify subtle clues in the conversation with the fraudulent user, and generate follow-up questions specifically designed to extract useful information from the fraudulent user.

Optionally, contact center 12 may further include event log system 29 configured to generate an entry in a centralized event log for each call into contact center 12. Event log system 29 is configured to gather and store data for the call from across the plurality of disparate systems used by contact center 12 to service the call. For example, event log system 29 may gather call data associated with actions performed during the call from the front-end systems within contact center 12, e.g., IVR systems 22, agent desktop systems 24, and CRM system 26. Event log system 29 may also gather context data associated with origins of the call from the back-end systems of contact center 12, e.g., fraud detection system 17, call screening system 18, and call routing system 20. Event log system 29 may be configured to include both the call data and the context data in the call entry in the centralized event log, and to correlate the call entry with previous call entries for the same user to provide historical call data. Event log system 29 may gather the call data and the context data by requesting the data via application programming interfaces (APIs) for the disparate systems and/or by receiving the data via event log software plugins installed in the disparate systems.

In some examples, the call entry for the incoming call and any of the correlated call entries within the centralized event log may be accessible by IVR systems 22, agent desktop systems 24, or any other front-end system for use in determining how to handle the call, e.g., whether to continue the call as usual, or otherwise route or end the call in the case of a potential fraud determination. In accordance with the techniques of this disclosure, agents at agent desktop systems 24 may use the call entry in the centralized event log from event log system 29 along with the above-described notifications and recommended actions received from call screening system 18 to determine how to handle a given call. In some other examples, event log system 29 itself may analyze the data in the call entry along with the correlated call entries within the centralized event log, and forward a pointer to the call entry in the centralized event log to fraud prevention system 28 based on a potential fraud determination.

Once a fraud determination has been made for the call by one of IVR system 22, agent desktop systems 24, or event log system 29, a notification may be sent to fraud prevention system 28 for application of one or more interdiction schemes. In some examples, the interdiction scheme applied to the call may include transferring the call to one of agent desktop systems 24 and monitoring the resulting conversation using call screening system 18. In other examples, the interdiction scheme applied to the call may be transferring the call to the chat bot of the call screening system 18. Other interdiction schemes applied by fraud prevention system 28 may include requesting additional authentication from the fraudulent user, accepting only the most secure forms of authentication from the fraudulent user, randomizing IVR or banking servicing prompts, or dropping/blocking the call.

In some examples, the centralized event log maintained by event log system 29 may be used to train the AI engine of call screening system 18 used to identify a fraudulent or neutral intent of an incoming call into contact center 12. The AI engine may be trained using a first set of training data that includes the call data and the context data for previous calls identified as being fraudulent. Once the AI engine learns the identifying aspects of a fraudulent call from the first set of training data, the AI engine may be further trained using a second set of training data that includes the call data and the context data for previous calls identified as either fraudulent or neutral. The intent determinations made by the AI engine may then be compared against the second set of training data to determine the accuracy of the AI engine. Typically, high-level of accuracy, e.g., 90%, is required before implementing the AI engine in a working system such as call screening system 18. The AI engine may be periodically retrained using an updated set of training data generated from the centralized event log of event log system 29 or other data.

More details with respect to the event log system may be found in U.S. patent application Ser. No. 15/905,318, filed Feb. 26, 2018, entitled "Centralized Event Log Generation and Analysis for Contact Centers," the entire content of which is incorporated herein by reference.

Figure 2:
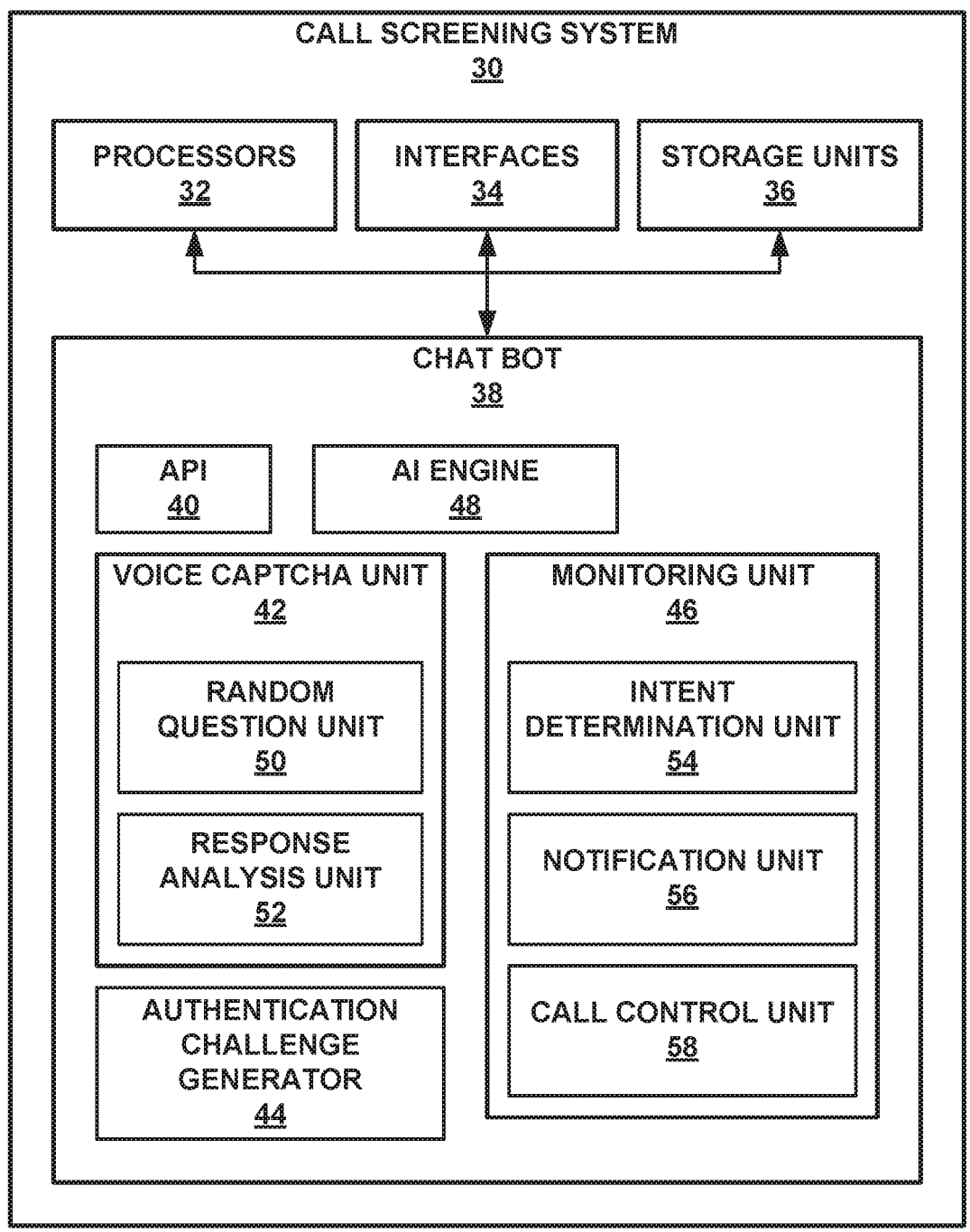
FIG. 2 is a block diagram illustrating an example of a call screening system within a contact center, in accordance with the techniques of this disclosure.

FIG. 2 is a block diagram illustrating an example of a call screening system 30 within a contact center of an organization, in accordance with the techniques of this disclosure. Call screening system 30 of FIG. 2 may be described as an example implementation of call screening system 18 within contact center 12 of FIG. 1. One or more aspects of call screening system 30 of FIG. 2 may be described within the context of contact center 12 of FIG. 1.

Call screening system 30 is configured to perform voice captcha and real-time monitoring of calls into contact center 12. In this way, call screening system 30 may assist human agents of the organization by initially filtering out robo-callers, and later providing recommendations to the agents for follow-up actions based on the identified intent of the calls. The architecture of call screening system 30 illustrated in FIG. 2 is shown for exemplary purposes only. Call screening system 30 should not be limited to the illustrated example architecture. In other examples, call screening system 30 may be configured in a variety of ways.

Call screening system 30 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, call screening system 30 represents a cloud computing system, server farm, and/or server cluster (or portion thereof) that provides services to client devices and other devices or systems. In other examples, call screening system 30 may represent or be implemented through one or more virtualized compute instances (e.g., virtual machines, containers) of a data center, cloud computing system, server farm, and/or server cluster.

As shown in the example of FIG. 2, call screening system 30 includes one or more processors 32, one or more interfaces 34, one or more storage units 36. Call screening system 30 also includes chat bot 38, which may be implemented as program instructions and/or data stored in storage units 36 and executable by processors 32. Storage units 36 of call screening system 30 may also store an operating system (not shown) executable by processors 32 to control the operation of components of call screening system 30. The components, units or modules of call screening system 30 are coupled (physically, communicatively, and/or operatively) using communication channels for inter-component communications. In some examples, the communication channels may include a system bus, a network connection, an inter-process communication data structure, or any other method for communicating data.

Processors 32, in one example, may comprise one or more processors that are configured to implement functionality and/or process instructions for execution within call screening system 30. For example, processors 32 may be capable of processing instructions stored by storage units 36. Processors 32 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Storage units 36 may be configured to store information within call screening system 30 during operation. Storage units 36 may include a computer-readable storage medium or computer-readable storage device. In some examples, storage units 36 include one or more of a short-term memory or a long-term memory. Storage units 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 36 are used to store program instructions for execution by processors 32. Storage units 36 may be used by software or applications running on call screening system 30 (e.g., chat bot 38) to temporarily store information during program execution.

Call screening system 30 may utilize interfaces 34 to communicate with external systems via one or more networks, e.g., contact center 12 of FIG. 1. Interfaces 34 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, contact center control system 30 utilizes interfaces 34 to wirelessly communicate with external systems, e.g., call routing system 20, IVR systems 22, agent desktop systems 24, CRM system 26, and fraud prevention system 28 of contact center 12 from FIG. 1.

In the illustrated example of FIG. 2, chat bot 38 includes an application programming interface (API) 40, a voice captcha unit 42, an authentication challenge generator 44, a monitoring unit 46, and an artificial intelligence (AI) engine. In accordance with the disclosed techniques, chat bot 38 is an AI-based call screener configured to perform voice captcha to determine whether a user of a user device placing a call into contact center 12 is human or a robot. Based on the user being human, chat bot 38 is further configured to monitor a conversation between the user and an agent of the organization during the call into contact center 12 to identify an intent of the call and provide recommendations for follow-up actions to the agent of the organization based on the identified intent.

In some examples, AI engine 48 may comprise a specialized hardware engine configured to execute AI, machine learning, or deep learning computations for multiple different models. In other examples, AI engine 48 may comprise an application or other software deployment configured to execute AI, machine learning, or deep learning computations for multiple different models on processors 32. Although illustrated in FIG. 2 as including a single AI engine 48, in other examples, call screening system 30 may include multiple AI engines to enable chat bot 38 to analyze and interact with voice calls into contact center 12. In addition, although illustrated in FIG. 2 as including a single API 40, in other examples, call screening system 30 may include a plurality of APIs to pull customer information from CRM system 26 and/or interact with any of the other systems within contact center 12.

Call screening system 30 receives an inbound call into contact center 12 originated by the user device. Call screening system 30 may receive the inbound call via interfaces 34, and forward the call to voice captcha unit 42 of chat bot 38. Voice captcha unit 42 of chat bot 38 is configured to perform voice captcha on the incoming call by sending a random question to the user device, and analyzing the received answer to determine whether the user of the user device is human or a robot. In the example illustrated in FIG. 2, voice captcha unit 42 includes a random question unit 50 and a response analysis unit 52.

Random question unit 50 of voice captcha unit 42 may select the random question to be sent to the user device from a plurality of questions using a random number generator. In some cases, the plurality of questions may be stored locally in storage units 36 of call screening system 30. In that case, the plurality of questions may be simple questions answerable by anyone, e.g., "what color is the sky," and not necessarily related to a specific customer of the organization. In other cases, the plurality of questions may be retrieved via either interfaces 34 or API 40 from CRM system 26 of FIG. 1 or another system or storage network of contact center 12. In this case, the plurality of questions may be customer specific and based on a customer profile for a customer identified by a phone number or other information gleaned from the inbound call.

Upon receipt of the inbound call, random question unit 50 may generate a random number and select the associated question from the plurality of questions to be sent to the user device. In this way, the selected question for each inbound call is truly random and cannot be anticipated such that robo-callers cannot be programmed to answer in an acceptable manner. The use of random questions, therefore, requires a human response to pass the initial screening and enter contact center 12.

Response analysis unit 52 of voice captcha unit 42 may analyze the received answer to the random question received from the user device to determine whether the user of the user device is human or a robot. In order to identify the user as human, response analysis unit 52 may determine that the received answer falls into an acceptable category of response to the random question regardless of whether the answer is actually a correct response to the random question. More specifically, response analysis unit 52 may use AI engine 48 to determine that the received answer is an acceptable response based on format (e.g., alpha or numeric), language, form of speech, or the like. For example, response analysis unit 52 may be expecting a response in the form of a color name for the case where the random questions is "what color is the sky." The received answer may be either a verbal or a touch-tone response. In the case where the answer is a verbal response, response analysis unit 52 may further perform voice analysis as part of the voice captcha to determine whether the verbal response is generated by a human voice or a recorded or synthesized voice.

Authentication challenge generator unit 44 of chat bot 38 is configured to generate one or more authentication challenges for the user based on a customer profile for a customer identified by a phone number or other information gleaned from the inbound call. The customer profile may be retrieved via either interfaces 34 or API 40 from CRM system 26 of FIG. 1. Authentication challenge generator unit 44 may generate ad hoc authentication challenges for the specific customer based on dynamic or modifiable customer information included in the customer profile, such as account information, contact information, customer preferences, and, in some cases, customer social media data. Alternatively, authentication challenge generator unit 44 may randomly select one or more authentication challenges from a set of authentication challenges based on the customer profile for the customer. The authentication challenges generated by authentication challenge generator unit 44 may be presented to the user device via one of IVR systems 22 or agent desktop systems 24 to authenticate the user of the user device as the customer of the organization.

Monitoring unit 46 of chat bot 38 is configured to monitor a conversation between the user of the user device and an agent at one of agent desktop systems 24 during the call into contact center 12. Monitoring unit 46 is further configured to identify an intent of the monitored call and provide recommendations for follow-up actions to the agent of the organization based on the identified intent. In some examples, monitoring unit 46 may be used to monitor all conversations between authenticated customers and agents of the organization. In other examples, monitoring unit 46 may only monitor conversations based on an explicit request for monitoring by the agent of the organization or some action requested by the customer. In the example illustrated in FIG. 2, monitoring unit 46 includes an intent determination unit 54, a notification unit 56, and a call control unit 58.

Upon receipt of a digitized version of the conversation to be monitored, intent determination unit 54 of monitoring unit 46 identifies an intent of the conversation as either fraudulent or neutral. Intent determination unit 54 uses AI engine 48 trained to identify fraudulent calls into contact center 12. As described above with respect to FIG. 1, AI engine 48 may be trained using a set of training data that includes data for previous calls identified as being fraudulent. As some examples, AI engine 48 may be trained to identify intent based on one or more of tone, volume, pauses or breaks in the conversation, and the like.

Notification unit 56 of monitoring unit 46 sends notification messages to the agent at the one of agent desktop system 24 indicating whether the call is fraudulent or neutral. In either case, notification unit 56 may also include an indication of a level of probability that the call could be fraudulent from intent determination unit 54. In addition to the intent notification messages, notification unit 56 may also provide recommended follow-up actions to the agent based on the identified intent. In some examples, notification unit 56 may send the notification messages along with the recommended follow-up actions as email, text, chat, push, or pop-up messages to the one of agent desktop systems 24 via interfaces 34. In other examples, notification unit 56 may send the notification messages along with the recommended follow-up actions as audio messages to an ear-piece of the agent that is linked to the one of agent desktop systems 24 via interfaces 34.

In the case where the call is identified as likely neutral, notification unit 56 may provide product sales recommendations for the agent to offer to the customer during the call. The product sales recommendations may be determined by notification unit 56 based on the customer profile for the customer retrieved from CRM system 26 via either interfaces 34 or API 40. In the case where the call is identified as likely fraudulent, notification unit 56 may provide fraud prevention actions for the agent to perform during the call. The fraud prevention actions may be determined by notification unit 56 based on the level of probability associated with the identified fraudulent intent of the call. For example, a lower probability of fraud may result in recommendations that the agent take notes or otherwise log the fraudulent user's behavior during the call, or ask user specific questions during the call in an attempt to obtain additional information about the fraudulent user. As another example, a higher probability of fraud may result in recommendations that the agent transfer the call to call control unit 58 of monitoring unit 46 or transfer the call to fraud prevention system 28 of contact center 12.

Call control unit 58 of monitoring unit 46 may take control of the call from the agent at the one of agent desktop systems 24 of contact center 12. Call control unit 58 may use AI engine 48 to mimic a human agent and continue the conversation with the customer. In some examples, call control unit 58 may be configured to conform to the customer's language or regional accent in an attempt to build a rapport with the customer. In this way, call control unit 58 may provide a better user experience for the actual customer or, conversely, make a fraudulent user impersonating the actual customer more likely to let their guard down.

In the case where the call is identified as likely fraudulent, call control unit 58 may take control of the call to obtain additional information about the fraudulent user. Call control unit 58 may retrieve all of the customer information available to the organization from CRM system 26 or other systems via either interfaces 34 or API 40. Call control unit may then process the customer information and the conversation with the fraudulent user in real time using AI engine 48. In this way, the call control unit 58 may identify subtle clues in the conversation with the fraudulent user and generate follow-up questions specifically designed to extract useful information from the fraudulent user in order to create a fraud profile or signature for future fraud prevention.

Figure 3:
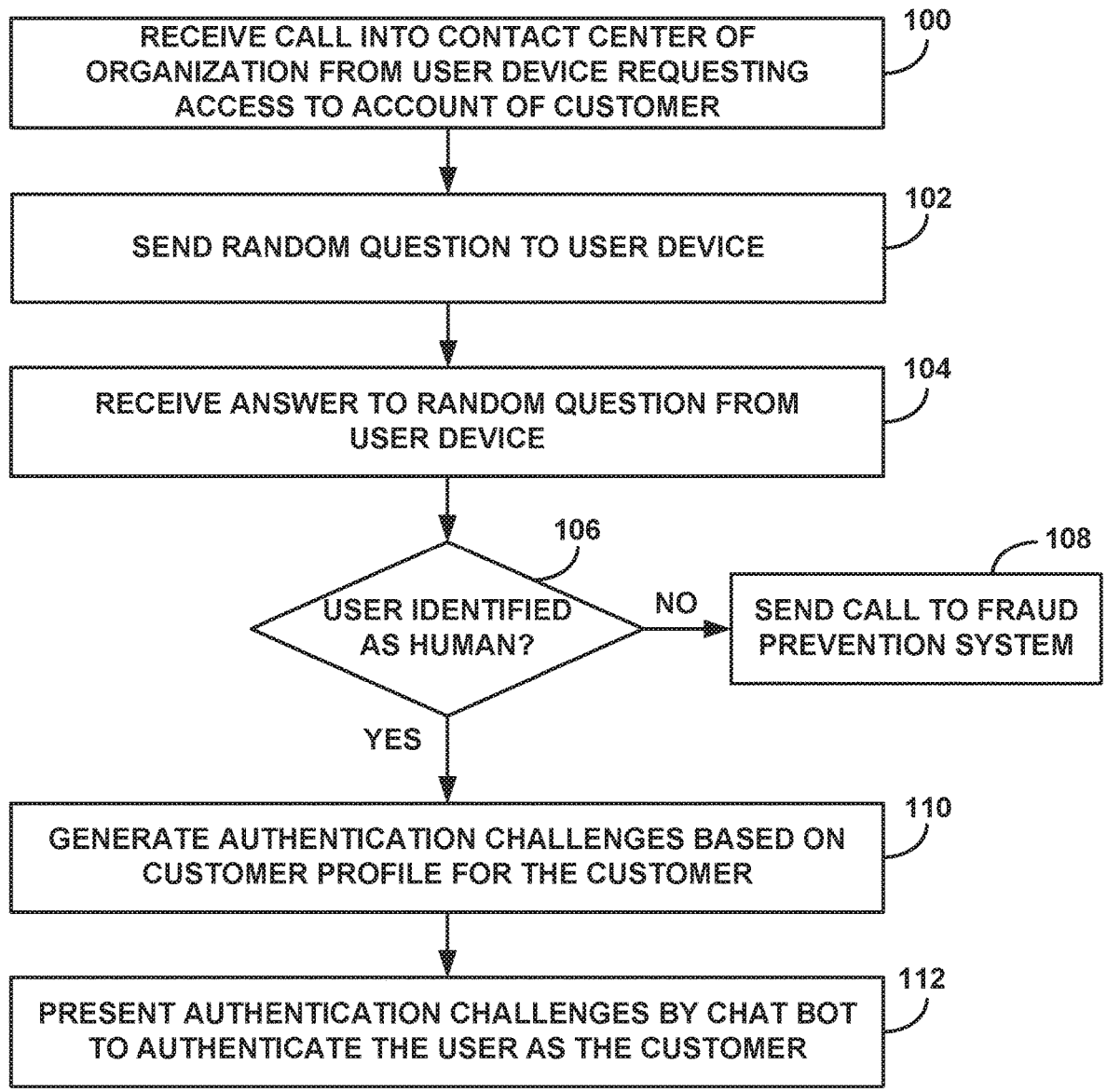
FIG. 3 is a flowchart illustrating an example operation of a call screening computing system within a contact center performing voice captcha and authentication, in accordance with the techniques of this disclosure.

FIG. 3 is a flowchart illustrating an example operation of a call screening computing system within a contact center performing voice captcha and authentication, in accordance with the techniques of this disclosure. The example operation of FIG. 3 is described with respect to call screening system 30 of FIG. 2. In other examples, the operation of FIG. 3 may be performed by call screening system 18 within contact center 12 of FIG. 1.

Call screening system 30 receives a call into a contact center of an organization, e.g., contact center 12 of FIG. 1, from a user device, e.g., one of user devices, requesting access to an account of a customer at the organization (100). Prior to authenticating a user of the user device as the customer of the organization, chat bot 38 of call screening system 30 sends a random question to the user device (102). In some examples, voice captcha unit 42 of chat bot 38 may select the random question from a plurality of questions using a random number generator. The random question cannot be anticipated and, thus, robo-callers cannot be programmed to answer the question in an acceptable manner. In this way, the random question requires a human response.

Chat bot 38 receives an answer to the random question from the user device (104), and determines whether or not the user of the user device is human or a robot based on an analysis of the received answer (106). In some examples, voice captcha unit 42 of chat bot 38 analyzes the received answer, which may be a verbal or touch-tone response, to determine whether the received answer is an acceptable response to the random question, indicating a human user. An acceptable response may be a correct response to the random question, or merely an intelligible response to the random question. For example, voice captcha unit 42 may determine that the user is human based on receipt of a response that is the wrong answer to the random question but falls into an acceptable category based on format (e.g., alpha or numeric), language, form of speech, or the like. In other examples, when the received answer to the random question is a verbal response, voice captcha unit 42 performs voice analysis on the verbal response to determine that the verbal response is generated by a human voice.

If the user is a robot (NO branch of 106), chat bot 38 sends the call to a fraud prevention system in the contact center, e.g., fraud prevention system 28 of contact center 12 (108). If the user is human (YES branch of 106), chat bot 38 generates one or more authentication challenges based on a customer profile for the customer of the organization (110). The customer profile may be maintained by another system of the contact center, e.g., CRM system 26 of contact center 12, and include dynamic or modifiable customer information, such as account information, contact information, customer preferences, and, in some cases, customer social media data. In one example, authentication challenge generator 44 of chat bot 38 generates the authentication challenges by retrieving the customer profile and generating questions to be answered by the user of the user device to be authenticated as the customer of the organization, where the answers to the questions are based on the customer profile for the customer. In another example, authentication challenge generator 44 may randomly select the one or more authentication challenges from a set of authentication challenges based on the customer profile for the customer.

Chat bot 38 then presents the one or more authentication challenges used to authenticate the user of the user device as the customer of the organization (112). In some cases, chat bot 38 of call screening system 30 may perform user authentication itself based on the authentication challenges. In other cases, chat bot 38 may instead present the authentication challenges used by other systems to perform user authentication. For example, based on the user of the user device being human, chat bot 38 sends the call received from the user device to a call routing system of the contact center, e.g., call routing system 20 of contact center 12. The call routing system routes the call to one of an IVR system or an agent desktop system of the contact center, e.g., one of IVR systems 22 or agent desktop systems 24 of contact center 12. Chat bot 38 then presents the authentication challenges to the user device via the one of the IVR system or the agent desktop system performing user authentication.

Figure 4:
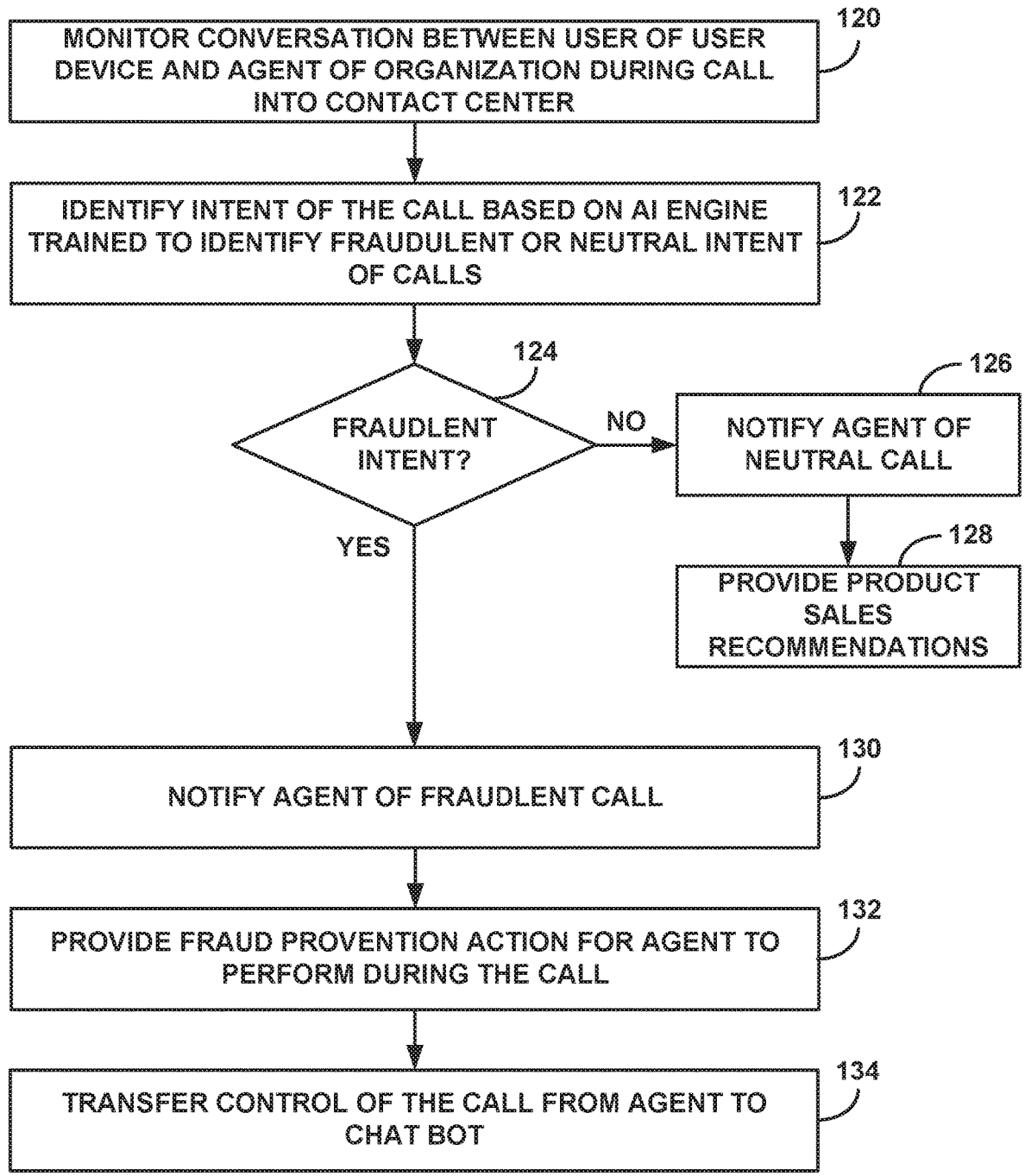
FIG. 4 is a flowchart illustrating an example operation of a call screening computing system within a contact center performing call monitoring, in accordance with the techniques of this disclosure.

FIG. 4 is a flowchart illustrating an example operation of a call screening computing system within a contact center performing call monitoring, in accordance with the techniques of this disclosure. The example operation of FIG. 4 is described with respect to call screening system 30 of FIG. 2. In other examples, the operation of FIG. 4 may be performed by call screening system 18 within contact center 12 of FIG. 1. The example operation of FIG. 4 may follow the example operation of performing voice captcha and authentication described above with respect to FIG. 3.

After a user of a user device calling into a contact center of an organization, e.g., contact center 12 of FIG. 1, is authenticated as a customer of the organization, chat bot 38 of call screening system 30 monitors a conversation between the user of the user device and an agent of the organization during the call into the contact center (120). In the example of contact center 12 of FIG. 1, chat bot 38 may monitor a conversation between a user of one of user devices 16 and a human agent at one of agent desktop systems 24. Monitoring unit 46 of chat bot 38 identifies an intent of the call based on AI engine 48 trained to identify either fraudulent or neutral intent of calls into the contact center (122).

If the call has a neutral intent (NO branch of 124), monitoring unit 46 notifies the agent at an agent desktop system of the contact center that the call is neutral (126). Monitoring unit 46 then provides product sales recommendations based on the customer profile for the customer to the agent at the agent desktop system (128). The agent at the agent desktop system may use the product sales recommendations to offer targeted products of the organization to the customer during the call.

If the call has a fraudulent intent (YES branch of 124), monitoring unit 46 notifies the agent at an agent desktop system of the contact center that the call is potentially fraudulent (130). Monitoring unit 46 then provides fraud prevention actions for the agent at the agent desktop system to perform during the call (132). The fraud prevention actions may include taking notes or otherwise logging the fraudulent user's behavior during the call, asking the fraudulent user specific questions during the call in an attempt to obtain additional information about the fraudulent user, or transferring the call to a fraud prevention system of the contact center, e.g., fraud prevention system 28 of contact center 12 of FIG. 1.

As an optional step, monitoring unit 46 may transfer control over the call from the agent at the agent desktop system to chat bot 38 (134). In some examples, a call control transfer may be triggered based on a level of probability associated with the identified fraudulent intent of the call, a transfer request by the agent at the agent desktop system, or some action requested by the fraudulent user. Chat bot 38 may mimic a human agent and continue the conversation with the fraudulent user of the user device in order to obtain additional information about the fraudulent user. In some scenarios, because chat bot 38 has access to all of the customer information available to the organization and the ability to process the customer information in real time, chat bot 38 may be better able to obtain identifying or other information about the fraudulent user that may be used to create a fraud profile or signature for future fraud prevention.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computer-implemented method comprising:
   receiving, by a computing system and from a user device, a call into a contact center of an organization, wherein the call requests access to an account of a customer at the organization;
   prior to authenticating a user of the user device as the customer of the organization, sending, by the computing system and to the user device, a random question;
   receiving, by the computing system and from the user device, an answer to the random question;
   determining, by the computing system, that the user of the user device is human and not a robot based on an analysis of the received answer, wherein the received answer to the random question is a verbal response received from the user device, and wherein determining that the user is human and not a robot comprises performing voice analysis on the verbal response to determine that the verbal response is generated by a human voice;
   based on the user being human, generating, by the computing system, one or more authentication challenges based on a customer profile for the customer of the organization;
   presenting, by the computing system and to the user device, the one or more authentication challenges used to authenticate the user of the user device as the customer of the organization; and
   after the user of the user device is authenticated as the customer of the organization, sending, by the computing system, the call received from the user device to one of an account service interactive voice response (IVR) system or an agent desktop system of the contact center.

2. The method of claim 1, wherein determining that the user is human and not a robot comprises analyzing the received answer to determine that the received answer is an acceptable response to the random question.

3. The method of claim 1, further comprising selecting, by the computing system, the random question from a plurality of questions using a random number generator.

4. The method of claim 1, wherein generating the one or more authentication challenges comprises:
   retrieving the customer profile from another system of the contact center, wherein the customer profile includes modifiable customer information; and
   generating questions to be answered by the user of the user device to be authenticated as the customer of the organization, wherein answers to the questions are based on the customer profile for the customer.

5. The method of claim 1, wherein generating the one or more authentication challenges comprises randomly selecting the one or more authentication challenges from a set of authentication challenges based on the customer profile for the customer.

6. The method of claim 1, further comprising, based on the user of the user device being human, sending, by the computing system, the call received from the user device to one of an authentication interactive voice response (IVR) system or the agent desktop system of the contact center, wherein presenting the one or more authentication challenges used to authenticate the user as the customer comprises presenting, by the computing system, the one or more authentication challenges to the user device via the one of the authentication IVR system or the agent desktop system.

7. The method of claim 1, wherein, after the user of the user device is authenticated as the customer of the organization and the call received from the user device is sent to the agent desktop system of the contact center, the method further comprising:
   monitoring, by the computing system, a conversation between the user of the user device and an agent of the organization during the call into the contact center; and
   identifying, by the computing system, an intent of the call based on an artificial intelligence engine trained to identify either fraudulent or neutral intent of calls into the contact center.

8. The method of claim 7, further comprising, based on identifying a fraudulent intent of the call, notifying, by the computing system, the agent at the agent desktop system of the contact center that the call is fraudulent, and providing, by the computing system and to the agent at the agent desktop system, fraud prevention actions for the agent to perform during the call.

9. The method of claim 7, further comprising, based on identifying a fraudulent intent of the call, notifying, by the computing system, the agent at the agent desktop system of the contact center that the call is fraudulent, and transferring, by the computing system, control over the call from the agent at the agent desktop system to a chat bot of the computing system.

10. The method of claim 7, further comprising, based on identifying a neutral intent of the call, notifying, by the computing system, the agent at the agent desktop system of the contact center that the call is neutral, and providing, by the computing system and to the agent at the agent desktop system, product sales recommendations based on the customer profile for the customer.

11. The method of claim 1, further comprising, based on the user of the user device being a robot, notifying a fraud prevention system for application of one or more interdiction schemes to the call received from the user device.

12. A computing system comprising:
   one or more storage units; and
   one or more processors in communication with the storage units and configured to:
      receive, from a user device, a call into a contact center of an organization, wherein the call requests access to an account of a customer at the organization;
      prior to authenticating a user of the user device as the customer of the organization, send, to the user device, a random question;
      receive, from the user device, an answer to the random question;
      determine that the user of the user device is human and not a robot based on an analysis of the received answer, wherein the received answer to the random question is a verbal response received from the user device, and wherein, to determine that the user is human and not a robot, the one or more processors are configured to perform voice analysis on the verbal response to determine that the verbal response is generated by a human voice;
      based on the user being human, generate one or more authentication challenges based on a customer profile for the customer of the organization;
      present, to the user device, the one or more authentication challenges used to authenticate the user of the user device as the customer of the organization; and
      after the user of the user device is authenticated as the customer of the organization, send the call received from the user device to one of an account service interactive voice response (IVR) system or an agent desktop system of the contact center.

13. The computing system of claim 12, wherein, to determine that the user is human and not a robot, the one or more processors are configured to analyze the received answer to determine that the received answer is an acceptable response to the random question.

14. The computing system of claim 12, wherein the one or more processors are configured to select the random question from a plurality of questions using a random number generator.

15. The computing system of claim 12, wherein, to generate the one or more authentication challenges, the one or more processors are configured to:
retrieve the customer profile from another system of the contact center, wherein the customer profile includes modifiable customer information; and
generate questions to be answered by the user of the user device to be authenticated as the customer of the organization, wherein answers to the questions are based on the customer profile for the customer.

16. The computing system of claim 12, wherein, to generate the one or more authentication challenges, the one or more processors are configured to randomly select the one or more authentication challenges from a set of authentication challenges based on the customer profile for the customer.

17. The computing system of claim 12, wherein the one or more processors are configured to, based on the user of the user device being human, send the call received from the user device to one of an authentication interactive voice response (IVR) system or the agent desktop system of the contact center, wherein the one or more processors are configured to present the one or more authentication challenges to the user device via the one of the authentication IVR system or the agent desktop system.

18. The computing system of claim 12, wherein the one or more processors are configured to, after the user of the user device is authenticated as the customer of the organization and the call received from the user device is sent to the agent desktop system of the contact center:
monitor a conversation between the user of the user device and an agent of the organization during the call into the contact center; and
identify an intent of the call based on an artificial intelligence engine trained to identify either fraudulent or neutral intent of calls into the contact center.

19. The computing system of claim 18, wherein the one or more processors are configured to, based on identifying a fraudulent intent of the call, notify the agent at the agent desktop system of the contact center that the call is fraudulent, and provide, to the agent at the agent desktop system, fraud prevention actions for the agent to perform during the call.

20. The computing system of claim 18, wherein the one or more processors are configured to, based on identifying a fraudulent intent of the call, notify the agent at the agent desktop system of the contact center that the call is fraudulent, and transfer control over the call from the agent at the agent desktop system to a chat bot of the computing system.

21. The computing system of claim 18, wherein the one or more processors are configured to, based on identifying a neutral intent of the call, notify the agent at the agent desktop system of the contact center that the call is neutral, and provide, to the agent at the agent desktop system, product sales recommendations based on the customer profile for the customer.

22. The computing system of claim 12, wherein the one or more processors are configured to, based on the user of the user device being a robot, notify a fraud prevention system for application of one or more interdiction schemes to the call received from the user device.

23. A non-transitory computer readable medium including instructions that when executed cause one or more processors to:
receive, by a computing system and from a user device, a call into a contact center of an organization, wherein the call requests access to an account of a customer at the organization;
prior to authenticating a user of the user device as the customer of the organization, send, by the computing system and to the user device, a random question;
receive, by the computing system and from the user device, an answer to the random question;
determine, by the computing system, that the user of the user device is human and not a robot based on an analysis of the received answer, wherein the received answer to the random question is a verbal response received from the user device, and wherein, to determine that the user is human and not a robot, the instructions cause the one or more processors to perform voice analysis on the verbal response to determine that the verbal response is generated by a human voice;
based on the user being human, generate, by the computing system, one or more authentication challenges based on a customer profile for the customer of the organization;
present, by the computing system and to the user device, the one or more authentication challenges used to authenticate the user of the user device as the customer of the organization; and
after the user of the user device is authenticated as the customer of the organization, send the call received from the user device to one of an account service interactive voice response (IVR) system or an agent desktop system of the contact center.

* * * * *